(12) United States Patent
Narayanan et al.

(10) Patent No.: US 12,450,622 B2
(45) Date of Patent: Oct. 21, 2025

(54) AUTOMATED CUSTOMER ENGAGEMENT PREDICTION AND CLASSIFICATION

(71) Applicant: FMR LLC, Boston, MA (US)

(72) Inventors: Siddharth Narayanan, Cambridge, MA (US); Amin Assareh, Boston, MA (US); Wenlu Yan, Poway, CA (US)

(73) Assignee: FMR LLC, Boston, MA (US)

( * ) Notice: Subject to any disclaimer, the term of this patent is extended or adjusted under 35 U.S.C. 154(b) by 337 days.

(21) Appl. No.: 18/108,113

(22) Filed: Feb. 10, 2023

(65) Prior Publication Data
US 2024/0273563 A1 Aug. 15, 2024

(51) Int. Cl.
G06Q 30/00 (2023.01)
G06Q 10/04 (2023.01)
G06Q 30/0204 (2023.01)

(52) U.S. Cl.
CPC ......... G06Q 30/0205 (2013.01); G06Q 10/04 (2013.01)

(58) Field of Classification Search
None
See application file for complete search history.

(56) References Cited

U.S. PATENT DOCUMENTS

| | | | |
|---|---|---|---|
| 7,006,881 B1 * | 2/2006 | Hoffberg | G06V 40/103 709/200 |
| 10,361,802 B1 * | 7/2019 | Hoffberg-Borghesani | G06F 3/00 |
| 10,832,260 B2 | 11/2020 | Shen et al. | |
| 11,100,524 B1 | 8/2021 | Ross et al. | |
| 11,210,607 B2 * | 12/2021 | Kenny | G06N 20/20 |
| 11,544,627 B1 * | 1/2023 | Bryce | G06Q 40/03 |
| 11,854,024 B2 * | 12/2023 | Towriss | G06Q 30/0631 |
| 12,014,254 B2 * | 6/2024 | Bryce | G06Q 40/03 |
| 12,130,841 B2 * | 10/2024 | Aggarwal | G06N 3/0442 |

(Continued)

OTHER PUBLICATIONS

G. Martín, Alejandro, et al. "A survey for user behavior analysis based on machine learning techniques: current models and applications." Applied Intelligence 51.8 (2021): 6029-6055. (Year: 2021).*

(Continued)

Primary Examiner — Gurkanwaljit Singh
(74) Attorney, Agent, or Firm — Cesari and McKenna, LLP

(57) ABSTRACT

Methods and apparatuses are described for automated customer engagement prediction and classification. A server generates a feature vector comprising variables corresponding to historical user activity data for a user. The server encodes, for each feature vector, each variable in the feature vector into a corresponding weight-of-evidence value. The server transforms each encoded feature vector into an embedding in a multidimensional vector space. The server generates, for each user, a user engagement probability value by identifying embeddings of other users in proximity to the user embedding using a similarity measure and determining an engagement outcome for the identified embeddings. The server assigns each user to an engagement probability cluster based upon the engagement probability value for the user. The server generates instructions for a remote device to initiate communications to each user based upon the assigned engagement probability cluster.

18 Claims, 6 Drawing Sheets

(56) References Cited

U.S. PATENT DOCUMENTS

| | | | | |
|---|---|---|---|---|
| 2016/0162800 | A1* | 6/2016 | Qin | G06N 3/082 |
| | | | | 706/12 |
| 2017/0220578 | A1* | 8/2017 | Kazi | G06Q 50/01 |
| 2017/0220579 | A1* | 8/2017 | Kazi | H04L 67/306 |
| 2018/0005161 | A1* | 1/2018 | Cong | G06Q 10/06398 |
| 2019/0034994 | A1* | 1/2019 | Wu | G06Q 30/0631 |
| 2019/0251476 | A1* | 8/2019 | Shiebler | G06N 3/08 |
| 2019/0295126 | A1* | 9/2019 | Madden | G06N 20/00 |
| 2020/0342348 | A1* | 10/2020 | Kenny | G06N 20/00 |
| 2021/0192568 | A1* | 6/2021 | Taghavi Nasr Abadi | |
| | | | | G06N 20/20 |
| 2021/0263939 | A1* | 8/2021 | Das | G06F 16/24578 |
| 2022/0116793 | A1* | 4/2022 | Osinski | H04M 15/41 |
| 2022/0215431 | A1* | 7/2022 | El Ghazzal | G06Q 30/0255 |
| 2023/0141007 | A1* | 5/2023 | Bryce | G06N 3/09 |
| | | | | 706/12 |
| 2023/0172510 | A1* | 6/2023 | Alford | A61B 5/167 |
| | | | | 434/236 |
| 2024/0221052 | A1* | 7/2024 | Chaganti | G06Q 30/0633 |

OTHER PUBLICATIONS

Droomer, Marli. Predicting the next purchase date for an individual customer using machine learning. Diss. Stellenbosch: Stellenbosch University, 2020. (Year: 2020).*

Crowe, Chad. Predicting User Interaction on Social Media using Machine Learning. MS thesis. University of Nebraska at Omaha, 2018. (Year: 2018).*

E. Zdravevski, et al., "Weight of evidence as a tool for attribute transformation in the preprocessing stage of supervised learning algorithms," The 2011 International Joint Conference on Neural Networks, 2011, pp. 181-188.

D. Kingma & M. Welling, "An Introduction to Variational Autoencoders," Foundations and Trends® in Machine Learning, arXiv:1906. 026913 [cs.LG] Dec. 11, 2019, available at https://arxiv.org/pdf/1906.02691v3.pdf, 89 pages.

R. Mancisidor, et al., "Learning Latent Representations of Bank Customers With The Variational Autoencoder," arXiv:1903. 06580v1 [stat.ML] Mar. 14, 2019, available at https://arxiv.org/pdf/1903.06580v1.pdf, 17 pages.

* cited by examiner

| ID # | Age | Residence Value Range | Total Invest. Assets | Estimated Income Range | # children | Primary HH Affluence | # Adults | Credit Card? | Crossover | Marital Status | SPS | Total Retail Brokerage Assets | ... |
|---|---|---|---|---|---|---|---|---|---|---|---|---|---|
| 1 | 93 | -1.5 | 718.19 | -1 | 0 | 6 | 6 | 0 | 1 | 2 | 0 | -1 | ... |
| 2 | 80 | 287.4995 | 344.22 | 7.5 | 2 | 2 | 1 | 1 | 2 | 1 | 0 | 4010.49 | ... |
| 3 | 83 | 12.9995 | 4052.6 | 62.5 | 0 | 0 | 3 | 1 | 1 | 0 | 0 | 913163.99 | ... |
| 4 | 70 | 324.9995 | 619.09 | 25 | 0 | 4 | 1 | 1 | 1 | 0 | 0 | 50913.6 | ... |
| 5 | 81 | 162.4995 | 268.50 | 62.5 | 0 | 4 | 0 | 1 | 1 | 1 | 0 | 24285.38 | ... |
| 6 | 65 | 212.4995 | 1896.4 | 45 | 0 | 0 | 2 | 1 | 3 | 1 | 1 | 401844.58 | ... |
| 7 | 72 | 637.4995 | 5547.5 | 150 | 0 | 0 | 2 | 1 | 1 | 0 | 0 | 115529.01 | ... |
| 8 | 76 | 1500 | 923.97 | 112.4 | 0 | 3 | 1 | 1 | 1 | 0 | 0 | 83967.69 | ... |
| 9 | 69 | 637.4995 | 1978.6 | 150 | 2 | 3 | 5 | 1 | 1 | 0 | 0 | -1 | ... |
| 10 | 73 | 424.9995 | 3042.0 | 62.5 | 2 | 0 | 1 | 1 | 1 | 2 | 0 | 905675.07 | ... |

FIG. 3

```python
def woe_cont(x, y, n_bins=5, oversample=1):
    mu = np.mean(x)
    sigma = np.std(x)
    woe = x.copy()
    bin_edges = np.linspace(-3, 3, n_bins)
    bin_edges[0] = -np.inf
    bin_edges[-1] = np.inf
    sum_0 = (y == 0).sum()
    sum_1 = (y == 1).sum()
    for lo, hi in zip(bin_edges[:-1], bin_edges[1:]):
        lo = (lo * sigma) + mu
        hi = (hi * sigma) + mu
        mask = np.logical_and(lo < x, x <= hi)
        log_odds = np.log(
            (x[np.logical_and(mask, y == 0)].sum() / sum_0 + EPS)
            / (oversample * x[np.logical_and(mask, y == 1)].sum() / sum_1 + EPS)
        )
        woe[mask] = log_odds
    return woe
```
402

```python
def woe_disc(x, y, values, oversample=1):
    woe = x.copy()
    sum_0 = (y == 0).sum()
    sum_1 = (y == 1).sum()
    for v in values:
        mask = x == v
        log_odds = np.log(
            (x[np.logical_and(mask, y == 0)].sum() / sum_0 + EPS)
            / (oversample * x[np.logical_and(mask, y == 1)].sum() / sum_1 + EPS)
        )
        woe[mask] = log_odds
    return woe
```
404

AUTOMATED CUSTOMER ENGAGEMENT PREDICTION AND CLASSIFICATION

TECHNICAL FIELD

This application relates generally to methods and apparatuses, including computer program products, for automated customer engagement prediction and classification.

BACKGROUND

Large consumer-facing companies constantly face the challenge of retaining their existing customers and expanding to reach new customers, especially considering the fragmentation and diversity of customer bases. Companies want to spend their limited marketing and information technology resources in a way to optimize the successful engagement of customers and also take the customer's preferences, demographics, and needs into account. For example, diversity of a customer base can arise from different demographics like age, location, life events (marriage, retirement, etc.), personal situations and needs, time of the year, macro-economic factors, demand for the new products in the market, and the like. For customer-focused organizations, it is imperative to identify and address the specific personalized needs of each of the customers which, if not done, might lead to attrition of the customer base (and thus a decrease in revenue).

A difficulty in solving the above problem arises in the cost incurred by companies in developing and executing customer engagement strategies. For example, the high cost of phone representatives makes it necessary for companies to utilize their existing contact bandwidth in the most efficient way possible. Typically, a company's focus is to reach out to only those customers who have a high likelihood to be engaged, e.g., positively persuaded to purchase a product or use a service, and consequently contribute to the incremental revenue of the sales channel-instead of customers that have a low likelihood of engaging with a product or service and thus would not contribute to the incremental revenue.

Current engagement prediction systems have been developed using artificial intelligence (AI) techniques in an attempt to solve the above problems. For example, these systems can utilize classification modeling that tries to predict an outcome (e.g., whether or not a user will engage with a particular contact channel from a given customer's attributes) based upon historical data. However, these systems typically just focus on making single winner recommendations that are not based on the activity of other similar users. In addition, with the rate of data growth and the ever-changing customer preferences, the above-mentioned modeling systems require constant, manual scaling and re-tuning, as such models tend to decay with time. This means a significant investment of time and oversight to ensure that the models perform with accuracy in view of the most recent user engagement data.

SUMMARY

Therefore, what is needed are methods and systems for automated customer engagement prediction and classification using machine learning techniques that leverage activity and attributes of other similar users to determine a likelihood of user engagement. The techniques described herein advantageously provide for readily interpretable predictions of likely next user actions based on the actions of their most similar individuals using a K-nearest neighbor approach in the latent space (e.g., variational autoencoder (VAE) embeddings).

The invention, in one aspect, features a computerized method of automated customer engagement prediction and classification. A server computing device generates a feature vector for each user of a plurality of users comprising a multidimensional array of variables corresponding to at least a portion of historical user activity data for the user, the historical user activity data comprising transaction data, demographic data, and user contact channel response data. The server computing device encodes, for each feature vector, each variable in the feature vector into a corresponding weight-of-evidence value. The server computing device transforms each encoded feature vector into an embedding comprising a multidimensional array with fewer variables than the encoded feature vector and positioning the embeddings in a multidimensional vector space. The server computing device generates, for each user, a user engagement probability value by identifying one or more embeddings of other users in proximity to the embedding of the user using a similarity measure and determining an engagement outcome for the users associated with the identified embeddings. The server computing device assigns each user to an engagement probability cluster based upon the user engagement probability value for the user. The server computing device generates instructions for a remote computing device to initiate one or more communications to each user based upon the assigned engagement probability cluster.

The invention, in another aspect, features a system for automated customer engagement prediction and classification. The system comprises a server computing device having a memory for storing computer-executable instructions and a processor that executes the computer-executable instructions. The server computing device generates a feature vector for each user of a plurality of users comprising a multidimensional array of variables corresponding to at least a portion of historical user activity data for the user, the historical user activity data comprising transaction data, demographic data, and user contact channel response data. The server computing device encodes, for each feature vector, each variable in the feature vector into a corresponding weight-of-evidence value. The server computing device transforms each encoded feature vector into an embedding comprising a multidimensional array with fewer variables than the encoded feature vector and positioning the embeddings in a multidimensional vector space. The server computing device generates, for each user, a user engagement probability value by identifying one or more embeddings of other users in proximity to the embedding of the user using a similarity measure and determining an engagement outcome for the users associated with the identified embeddings. The server computing device assigns each user to an engagement probability cluster based upon the user engagement probability value for the user. The server computing device generates instructions for a remote computing device to initiate one or more communications to each user based upon the assigned engagement probability cluster.

Any of the above aspects can include one or more of the following features. In some embodiments, generating a feature vector for each user of the plurality of users comprises preprocessing the historical user activity data for the user using one or more of feature engineering, missing value handling, or normalization. In some embodiments, transforming each encoded feature vector into an embedding comprises applying a dimensionality reduction algorithm to the encoded feature vector to reduce the number of variables in the encoded feature vector, and generating the embedding from the modified encoded feature vector. In some embodiments, the dimensionality reduction algorithm comprises a variational autoencoder algorithm.

In some embodiments, identifying one or more embeddings of other users in proximity to the embedding of the user using a similarity measure comprises locating a plurality of embeddings of other users within a predetermined distance of the embedding of the user in the multidimensional vector space. In some embodiments, determining an engagement outcome for the users associated with the identified embeddings comprises determining whether the users associated with the identified embeddings previously engaged with a contact channel.

In some embodiments, the server computing device generates, for each user, a user engagement probability value associated with each of a plurality of different objectives and aggregates the user engagement probability values for each of the different objectives into an overall engagement probability value for the user. In some embodiments, aggregating the user engagement probability values for each of the different objectives into an overall engagement probability value for the user comprises calibrating each of the user engagement probability values for each of the different objectives according to a defined distribution and scale and combining the calibrated user engagement probability values. In some embodiments, generating instructions for a remote computing device to initiate one or more communications to each user based upon the assigned engagement probability cluster comprises determining a contact channel for each user based upon the engagement probability cluster to which the user is assigned and transmitting data associated with the contact channel for each user to a remote computing device, where the remote computing device initiates a communication to a computing device of each user via the contact channel.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of exemplary historical user activity data 300 stored in database 108a, where each row corresponds to attributes of a given user.

FIG. 4 is a diagram of exemplary pseudocode for implementing a weight-of-evidence calculation for continuous variables and for discrete variables.

DETAILED DESCRIPTION

Figure 1:
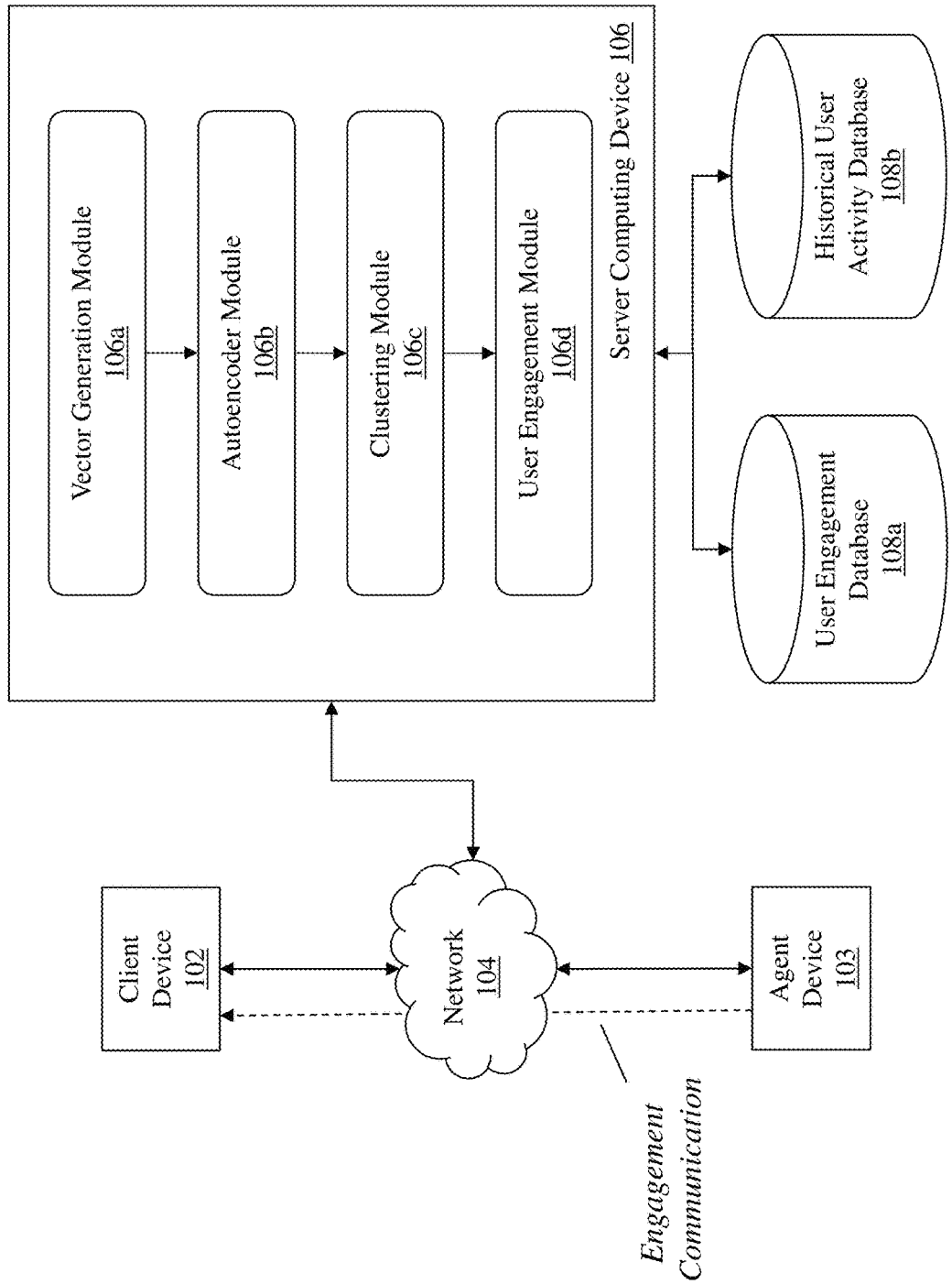
FIG. 1 is a block diagram of a system for automated customer engagement prediction and classification.

FIG. 1 is a block diagram of system 100 for automated customer engagement prediction and classification. System 100 includes client computing device 102, agent computing device 103, communications network 104, server computing device 106 that includes vector generation module 106a, auto encoder module 106b, clustering module 106c, and user engagement module 106d, historical user activity database 108a, and user engagement database 108b.

Client computing device 102 connects to communications network 104 in order to communicate with agent computing device 103 and/or server computing device 106 to provide input and receive output relating to the process for automated customer engagement prediction and classification as described herein. In some embodiments, client computing device 102 is coupled to a display device (not shown). For example, client computing device 102 can provide a graphical user interface (GUI) via the display device that presents output resulting from the methods and systems described herein. In some embodiments, client computing device 102 is operated by an end user (e.g., a customer using device 102 to receive engagement communications from agent computing device 103 and/or server computing device 106 (which can be operated by a business or other entity with which the customer has an existing relationship or to which the customer is a prospect or candidate).

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Agent computing device 103 (also referred to herein as a remote device) is a computing device coupled to server computing device 106 and is operated by a customer service representative and/or sales agent. In one example, agent computing device 103 is a workstation (e.g., desktop computer, telephony device) in a call center that enables the agent to access customer information, receive user engagement information from server computing device 106, and perform actions using software on agent computing device 103 to provide product recommendations to a user at the client device 102. In another example, agent computing device 103 is a computing device that is configured to automatically initiate engagement communications with client computing device 102 (e.g., via email, text message, app alert, etc.). Agent computing device 103 is capable of executing locally stored software applications and also capable of accessing software applications delivered from server computing device 106 (or other computing devices) via a cloud-based or software-as-a-service paradigm. In the case of a live agent operating agent computing device 103, the software applications can provide a wide spectrum of functionality (e.g., CRM, account, sales, inventory, ordering, information access, and the like) to the agent. As can be appreciated, other types of agent computing devices 103 that can establish a communication session with the server computing device 106 and/or the client device 102 are within the scope of the invention. In some embodiments, agent computing device 103 is connected directly to server computing device 106 (e.g., via local cable) and in some embodiments, agent computing device 103 is connected to server computing device 106 via communications network 104 and/or one or more local networks.

As mentioned above, agent computing device 103 can provide user engagement communications to client computing device 102 via a communications session. It should be appreciated that agent computing device 103 can provide user engagement communications via any number of different channels—for example, agent computing device 103 can provide the engagement communications via email, text, automated voice mail, automated chat, live phone call with the agent, link to a website, use of a software tool, and so forth. As described herein, historical engagement communication data and corresponding user response data can be optionally analyzed by server computing device 106 for each of these channels to determine, e.g., an incremental income value associated with each channel, a success rate for each channel, and the like, so that the user engagement communications described herein can be fine-tuned for an optimal result (i.e., selecting a channel to use for communicating information to a particular customer, where historical data for similar customers (or the same customer) using that channel exhibits a higher likelihood of engagement value than other channels).

Communications network 104 enables client computing device 102, agent computing device 103, server computing device 106, and databases 108a-108b to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for automated customer engagement prediction and classification as described herein. Server computing device 106 includes several computing modules 106a-106d that execute on one or more processors of server computing device 106. In some embodiments, modules 106a-106d are specialized sets of computer software instructions programmed onto one or more dedicated processors in server computing device 106 and can include specifically designated memory locations and/or registers for executing the specialized computer software instructions.

Although modules 106a-106d are shown in FIG. 1 as executing within the same server computing device 106, in some embodiments the functionality of modules 106a-106d can be distributed among a plurality of server computing devices. As shown in FIG. 1, server computing device 106 enables modules 106a-106d to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106d is described in detail below.

Databases 108a-108b are located on a single computing device (or in some embodiments, on a set of computing devices) coupled to server computing device 106 and are configured to receive, generate, and store specific segments of data relating to the process of automated customer engagement prediction and classification as described herein. In some embodiments, the entire databases 108a-108b (or a portion thereof) can be integrated with server computing device 106 or be located on a separate computing device or devices. Databases 108a-108b can be disk-based storage, random access memory (RAM), read-only memory (ROM), or other types of permanent or transient storage devices (e.g., Oracle™ Database 21c). In some embodiments, databases 108a-108b are configured as cloud-based storage (e.g., Amazon® S3™, Snowflake™). Databases 108a-108b can be configured to store portions of data used by the other components of system 100, as will be described in greater detail below.

Historical user activity database 108a includes historical user activity data, which in some embodiments is a dedicated section of the database 108a that contains specialized data used by the other components of system 100 to perform the process of automated customer engagement prediction and classification as described herein. Generally, historical user activity data comprises data elements, including but not limited to structured and/or unstructured computer text, relating to transaction data, demographic data, and user engagement response data. For example, database 108a can store customer profile information (e.g., age, gender, address, financial status, marital status, family composition, income, etc.), account balance and historical transaction information, and the like. In addition, database 108a can store information relating to a previously received user engagement communication from, e.g., agent computing device 103. For example, the customer may not have responded to a prior user engagement communication. Database 108a tracks this information for use in generating subsequent user engagement communications for the specific customer and for other customers as described herein.

User engagement database 108b includes data relating to the predictions and user engagement recommendations generated by server computing device 106 as described herein. In some embodiments, user engagement database 108b comprises predicted engagement outcomes, scores and clustering information generated by server computing device 106 for use in initiating user engagement communications with users. In some embodiments, the data comprises an engagement matrix that can be prioritized across customers or across engagement channels to generate a list of user engagement actions and/or communications for execution by, e.g., agent computing device 103.

Figure 2:
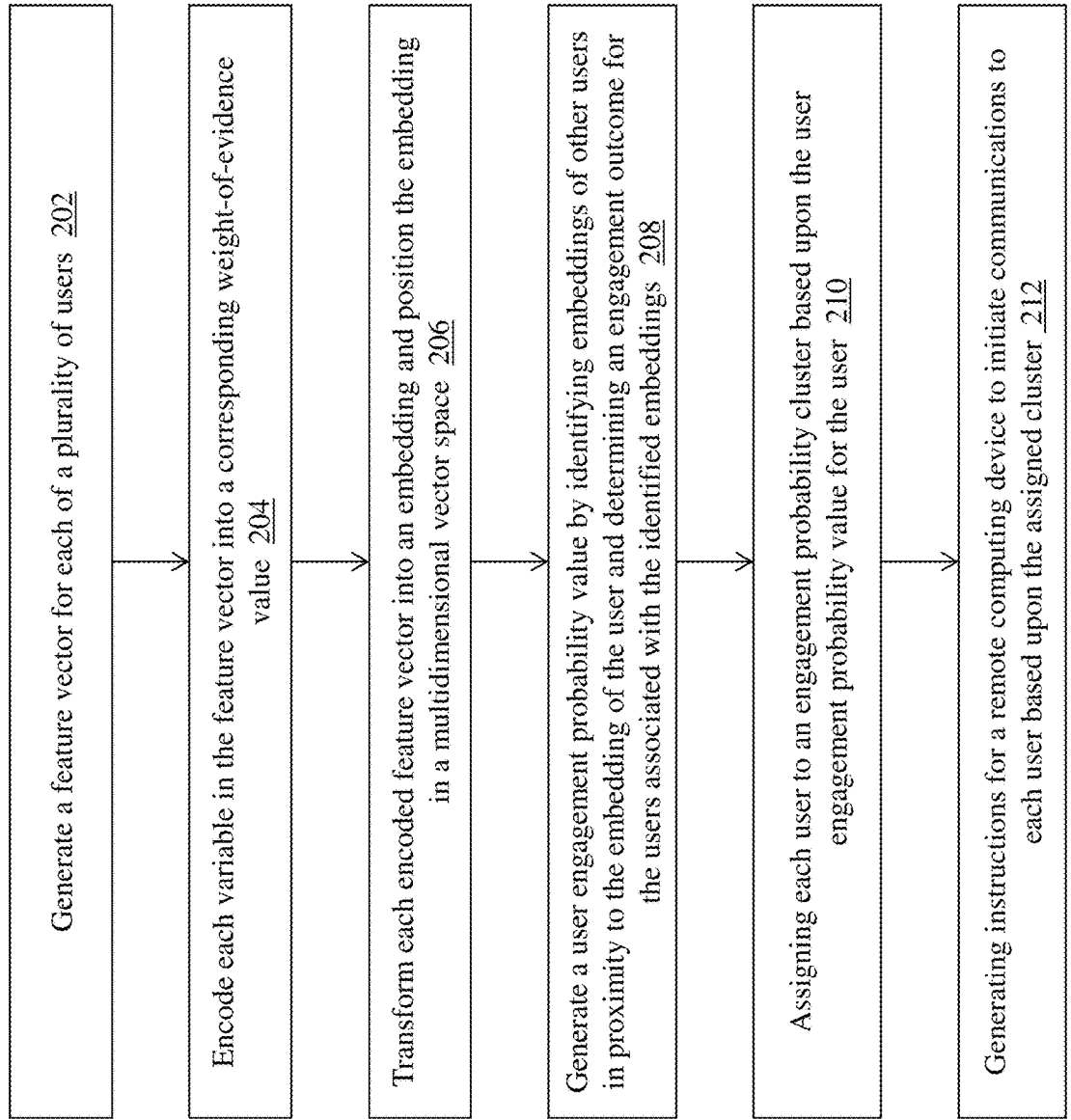
FIG. 2 is a flow diagram of a computerized method of automated customer engagement prediction and classification.

FIG. 2 is a flow diagram of a computerized method 200 for automated customer engagement prediction and classification, using system 100 of FIG. 1. Vector generation module 106a of server computing device 106 captures historical user activity data associated with a plurality of users (e.g., customers of an organization). As mentioned previously, in some embodiments the historical user activity data comprises transaction data (e.g., financial activity such as money flow, account opening, guidance, interactions through various channels), demographic data (e.g., age, gender, life events), and engagement response data (e.g., responses to various user engagement communications that occurred in the past, use of organization-related software engagement tools, etc.) corresponding to each of a plurality of users. The historical user activity data can be stored in historical user activity database 108a and retrieved by vector generation module 106a. In some embodiments, vector generation module 106a executes one or more queries against historical user activity database 108a to retrieve the historical user activity data. FIG. 3 is a diagram of exemplary historical user activity data 300 stored in database 108a, where each row corresponds to attributes of a given user (identified by the first column, ID #).

Turning back to FIG. 2, vector generation module 106a generates (step 202) a feature vector for each user of a plurality of users based upon the retrieved historical user activity data. The feature vector comprises a multidimensional vector with a plurality of features (expressed as numeric values in the feature vector) that correspond to attributes and characteristics of the user that are relevant in determining user engagement actions and communications for the user (e.g., the attributes and characteristics can be correlated to a likelihood of user engagement). It should be appreciated that the attributes and characteristics can vary depending on a specific business unit and/or use case. In some embodiments, vector generation module 106a can consider thousands of different user attributes and characteristics in determining a set of features to incorporate into the feature vector, with a goal of determining a broad set of features that are applicable to a full user population—rather than a biased sample. In some embodiments, module 106a consolidates the historical user activity data into a single dataset, in which each row corresponds to one user and each column represents a different feature. As can be appreciated, the historical user activity data may be stored in different granularity levels (e.g., customer level vs. account level), module 106a can perform feature engineering (such as one-hot encoding) to merge the data sources. Other data preprocessing tasks that can be performed by module 106a include missing value handling and normalization.

Vector generation module 106a then encodes (step 204), for each feature vector, each variable in the feature vector into a corresponding weight-of-evidence (WoE) value. The weight of evidence process encodes an independent variable based upon its predictive power in relation to the corresponding dependent variable. Generally, to perform the WoE calculation, module 106a partitions the feature vectors generated from the historical user activity data into a plurality of bins. For each bin, module 106a determines a number of events (i.e., user did engage) and non-events (i.e., user did not engage) in each bin and then calculates the percentages of events and non-events in each bin. Finally, module 106a calculates the weight-of-evidence value for each bin by determining the natural log (ln) of division of non-event percentage and event percentage:

$$WoE = \ln\left(\frac{\% \text{ of non-events}}{\% \text{ of events}}\right)$$

In some embodiments, module 106a does not need to partition the feature vectors into bins but instead can simply calculate the WoE value based upon the entire feature vector set. Also, in some embodiments, encoding a weight-of-evidence value from the feature vectors is not required; when WoE encoding is applied, module 106a does not need to perform an additional encoding for those features. Further detail about the weight-of-evidence algorithm is described in E. Zdravevski, et al., "Weight of evidence as a tool for attribute transformation in the preprocessing stage of supervised learning algorithms." *The* 2011 *International Joint Conference on Neural Networks,* 2011, pp. 181-188, which is incorporated herein by reference. FIG. 4 is a diagram of exemplary pseudocode for implementing a weight-of-evidence calculation for continuous variables ('woe_cont' function, 402) and for discrete variables ('woe_disc' function, 404).

Once the feature vectors are generated and encoded with WoE, autoencoder module 106b transforms (step 206) each encoded feature vector into an embedding comprising a multidimensional array with fewer variables than the encoded feature vector and positions the embeddings in a multidimensional vector space. As will be explained below, distance-based algorithms like K-nearest neighbor (KNN) work better in dense feature spaces as opposed to sparse feature spaces. Because the feature vectors generated by module 106a may have a large number of features, autoencoder module 106b applies dimensionality reduction in the form of an auto encoder algorithm to the feature vectors to map the features to a lower dimensional latent space. Generally, autoencoders are unsupervised neural networks which try to compress the input data (i.e., feature vector) to lower dimensional space (latent space) and then reconstruct the original data from that compressed latent space representation. Autoencoders try to minimize a loss function, which is the difference between the reconstructed signal and the original signal.

In some embodiments, autoencoder module 106b comprises a variational autoencoder (VAE) algorithm for dimensionality reduction. Different from standard autoencoders, instead of just learning a function to directly represent the data like autoencoders, variational autoencoders learn the parameters of a probability distribution representing the data. In this way, VAEs are generative models which learn to model the data distribution, sample from the distribution, and generate new input data samples. Exemplary variational autoencoder algorithms and techniques used by autoencoder module 106b are described in (i) D. Kingma and M. Welling, "An Introduction to Variational Autoencoders," Foundations and Trends® in Machine Learning, arXiv: 1906.026913 [cs.LG] 11 Dec. 2019; and (ii) R. Mancisidor, et al., "Learning Latent Representations of Bank Customers With The Variational Autoencoder," arXiv: 1903.06580v1 [stat.ML] 14 Mar. 2019, each of which is incorporated herein by reference.

Figure 5:
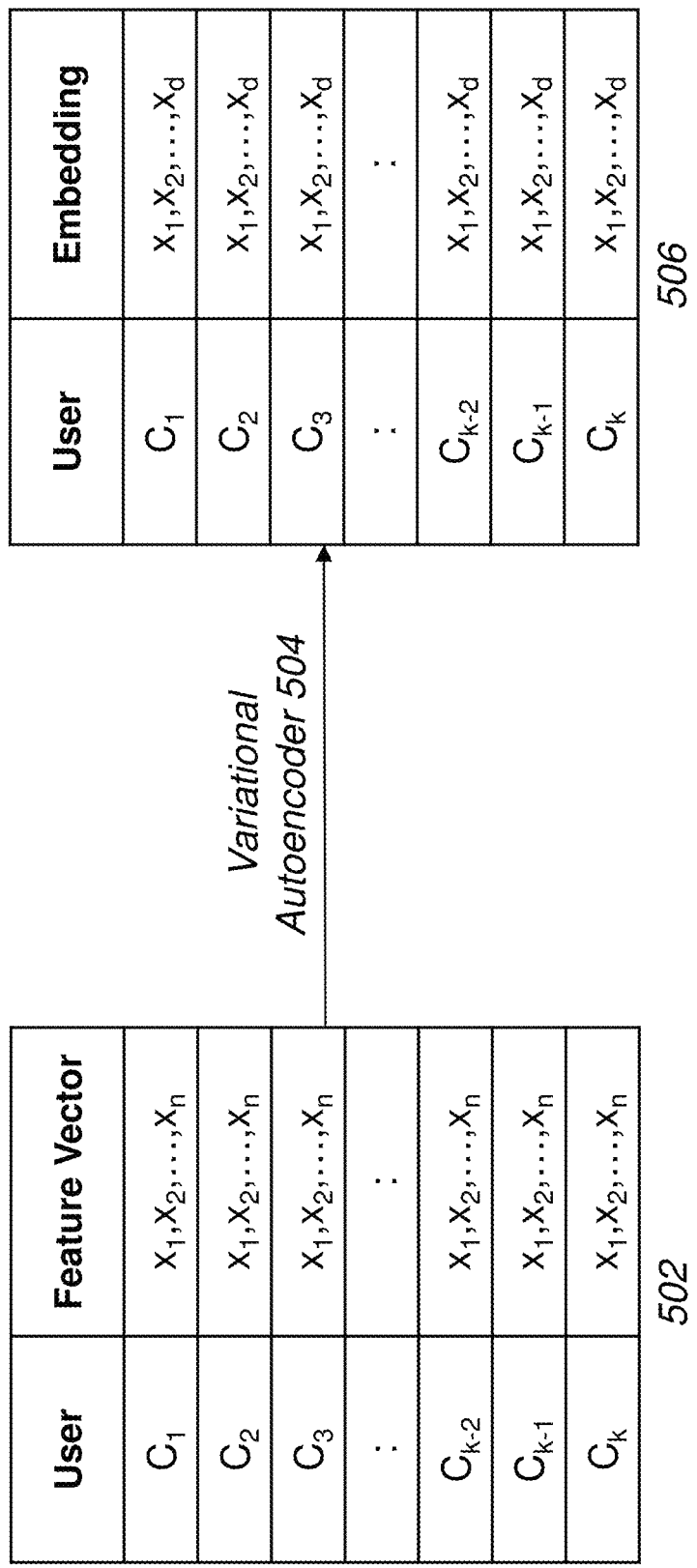
FIG. 5 is a diagram showing the transformation of the feature vector to a context embedding by the autoencoder module.
Figure 6:
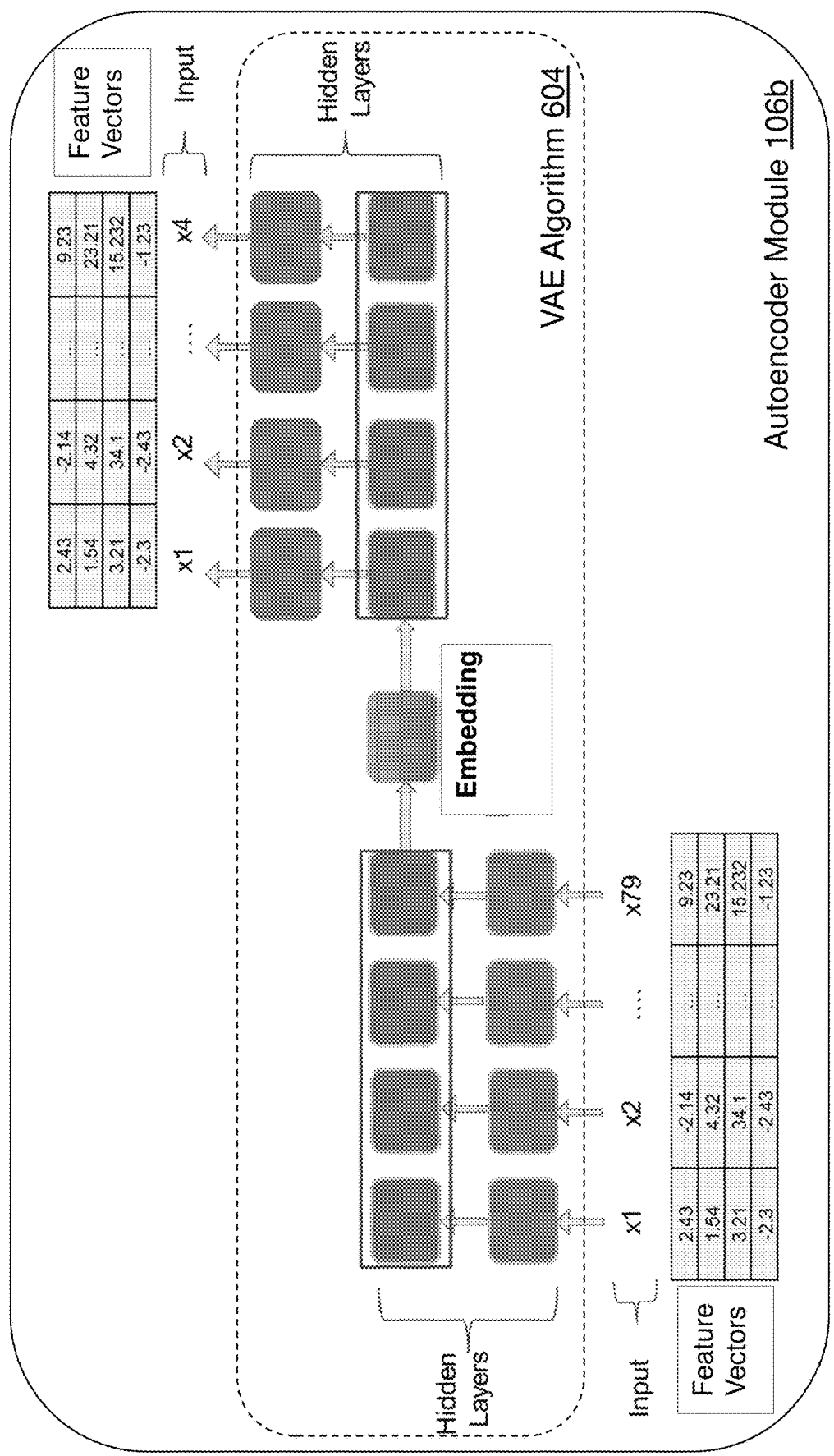
FIG. 6 is an exemplary architecture of the variational autoencoder (VAE) algorithm.

FIG. 5 is a diagram showing the transformation of the feature vector to a context embedding by autoencoder module 106b. As shown in FIG. 5, autoencoder module 106b collects the feature vectors 502 for a plurality of users C1-Ck and applies the VAE algorithm 404 on each feature vector to transform the feature vector into an embedding 506. FIG. 6 provides an exemplary architecture of the VAE algorithm 604. To train the autoencoder, autoencoder module 106b can choose different layers (dense) and other hyper-parameters like encoding and decoding dimensions. Module 106b finds the best layer values using, e.g., grid search and at the final stage, module 106b finds the optimality based on the similarity index between encoded and decoded dimensions. Autoencoder module 106b uses the VAE algorithm to determine an optimal number of dimensions d (in one example, d=38) based on the variance explained metric R2 (e.g., R2=80%) between raw features and decoded features.

Once the lower-dimensional embeddings are created, module 106b positions each embedding in a multidimensional vector space. Generally, embeddings with similar feature values are positioned closer to each other in the multidimensional vector space and further away from embeddings with different feature values. In some embodiments, the multidimensional vector space comprises a data structure or set of data structures (e.g., either stored locally and/or in an external data source) where each data structure comprises data elements corresponding to the attributes for a particular embedding in the vector space.

Once the multidimensional vector space has been created and embeddings positioned therein, clustering module 106c generates (step 208) a user engagement probability value by identifying one or more embeddings of other users in proximity to the embedding of the user in the multidimensional vector space using a similarity measure and determining an engagement outcome for the users associated with the identified embeddings. Generally, the user engagement probability value for a given user and engagement objective is based upon engagement outcomes for that objective associated with other users whose embeddings are in proximity to the user's embedding in the multidimensional vector space. In some embodiments, clustering module 106c determines k nearest neighbor embeddings to the user's embedding in the multidimensional vector space and identifies the number of those embeddings associated with a positive engagement outcome for a given objective (i.e., the other user historically engaged with a communication and/or tool). To generate the user engagement probability value, module 106c can use the following algorithm:

$$\text{User Engagement Probability Value} = \frac{p}{k}$$

where p is the number of nearest neighbor embeddings associated with a positive outcome and k is the total number of nearest neighbor embeddings. In one example, k is a hyperparameter that can be tuned for specific applications or objectives. In the case of multiple objectives (e.g., engagement with each of a number of different communication channels or engagement tools), module 106c can generate a user engagement probability value for each objective by executing the k-nearest neighbor algorithm for each objective (i.e., using a different KNN model) and then combining the individual user engagement probability values into an overall user engagement probability value for the user. In some embodiments, the number of positive engagement outcomes for a given objective may be very low relative to the size of the total user dataset. Module 106c can perform a weighting process to give examples from an underrepresented class more weight such that an average value for p is not too small. This weight can be set to the ratio of size of the overrepresented class to the size of the underrepresented class in the training dataset.

In the situation where module 106c generates a plurality of user engagement probability values for each of a number of different objectives, module 106c can perform a calibration step to ensure that the scores share the same distribution and scale before combining them. In this step, clustering module 106c maps the user engagement probability score generated by a given KNN classifier to the actual probability space such that the calibrated score indicates the probability of seeing the positive classes when using that score to cut off examples. In some embodiments, clustering module 106c applies the scikit-learn 1.2.0 library calibration module (available at scikit-learn.org/stable/modules/calibration.html) to perform the calibration. After calibration, module 106c combines each user engagement probability score using weights provided by, e.g., the organization or business unit according to the importance of each objective (i.e., a weighted average). The output from clustering module 106c is a user engagement probability score for each user based upon the corresponding embedding for that user.

Clustering module 106c provides the user engagement probability scores to user engagement module 106d for actioning. User engagement module 106d assigns (step 210) each user to an engagement probability cluster based upon the user engagement probability value for the user. In some embodiments, module 106d assigns a user to one of three clusters: (1) likely to engage; (2) might engage; or (3) unlikely to engage. In some embodiments, the cut off points and value ranges for each cluster can be decided according to business rules or other constraints of a given engagement communication campaign. In other embodiments, the clusters are determined by assigning an equal number (or approximately equal number) of users to each cluster—for example, if the output data set comprises one-hundred-twenty users, module 106d can assign the forty users with the highest user engagement probability values to a first cluster, the forty users with the next highest user engagement probability values to a second cluster, and the forty users with the lowest user engagement probability values to a third cluster.

Using the user engagement probability values and clusters, user engagement module 106d generates (step 212) programmatic instructions for a remote computing device (i.e., agent device 103) to initiate communications to one or more users based upon the assigned cluster. In one example, user engagement module 106d can prioritize selection of users to receive engagement communications in a given cluster according to the user engagement probability value—such as sorting the values in the cluster from highest to lowest overall or for a particular contact channel, thereby producing a prioritized list of users that should be engaged with first based upon a likelihood of engagement. It should be appreciated that user engagement module 106d can prioritize the initiation of user engagement communications in different ways (e.g., based upon varying business objectives) without departing from the scope of invention.

User engagement module 106d can identify the users that correspond to a particular cluster retrieve the users' contact information for one or more different channels to provide to agent computing device 103. For example, in a call center environment, user engagement module 106d can provide the user's phone numbers, other information (e.g., name, address, demographics, financial history, etc.) to agent computing device 103. A software module on agent computing device 103 (e.g., a CRM application that includes an autodialer) can populate a user interface on the agent device 103 that shows the list of customers to be contacted and simultaneously initiate a telephone call to client computing device 102 so that an agent at agent device 103 can attempt to engage the user (e.g., to learn more about a particular product or service, to answer questions, etc.). The software module on the agent device 103 can accordingly be configured to contact the client device 102 via any one or more communication channels—e.g., by automatically composing an email for agent review and transmission (or in some cases, automatically sending the email), and so forth.

Data relating to above user engagement attempts (and resulting successful engagements, if any) can be monitored and provided back to server computing device 106 and stored in historical user activity database 108a for subsequent ingestion by server computing device 106 to generate subsequent engagement probability values as described herein. Importantly, this type of feedback loop based upon user activity monitoring provides a beneficial way to continually refine the analysis performed by server computing device 106 based upon the latest activity data, so that server computing device 106 always has the most up-to-date historical engagement information for tuning or retuning the autoencoder.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated customer engagement prediction and classification, the method comprising:
   generating, by the server computing device, a feature vector for each user of a plurality of users comprising a multidimensional array of variables corresponding to at least a portion of historical user activity data for the user, the historical user activity data comprising transaction data, demographic data, and user contact channel response data;
   encoding, by the server computing device for each feature vector, each variable in the feature vector into a corresponding weight-of-evidence value;
   transforming, by the server computing device, each encoded feature vector into an embedding comprising a multidimensional array with fewer variables than the encoded feature vector and positioning the embeddings in a multidimensional vector space;
   generating, by the server computing device for each user, a user engagement probability value by identifying one or more embeddings of other users in proximity to the embedding of the user using a similarity measure and determining an engagement outcome for the users associated with the identified embeddings;
   assigning, by the server computing device, each user to an engagement probability cluster based upon the user engagement probability value for the user;
   determining, by the server computing device, a contact channel for each user based upon the engagement probability cluster to which the user is assigned; and
   transmitting, by the server computing device, data associated with the contact channel for each user to a remote computing device;
   wherein the remote computing device processes the data associated with the contact channel for each user to:
      automatically populate a user interface of an autodialing software application on the remote computing device with the data associated with the contact channel for each user; and
      simultaneously initiate a telephone call from the remote computing device to a client computing device associated with a first user via the autodialing software application.

2. The method of claim 1, wherein generating a feature vector for each user of the plurality of users comprises:
preprocessing the historical user activity data for the user using one or more of feature engineering, missing value handling, or normalization.

3. The method of claim 1, wherein transforming each encoded feature vector into an embedding comprises:
   applying a dimensionality reduction algorithm to the encoded feature vector to reduce the number of variables in the encoded feature vector; and
   generating the embedding from the modified encoded feature vector.

4. The method of claim 3, wherein the dimensionality reduction algorithm comprises a variational autoencoder algorithm.

5. The method of claim 1, wherein identifying one or more embeddings of other users in proximity to the embedding of the user using a similarity measure comprises:
   locating a plurality of embeddings of other users within a predetermined distance of the embedding of the user in the multidimensional vector space.

6. The method of claim 5, wherein determining an engagement outcome for the users associated with the identified embeddings comprises:
   determining whether the users associated with the identified embeddings previously engaged with a contact channel.

7. The method of claim 1, further comprising:
   generating, by the server computing device for each user, a user engagement probability value associated with each of a plurality of different objectives; and
   aggregating, by the server computing device, the user engagement probability values for each of the different objectives into an overall engagement probability value for the user.

8. The method of claim 7, wherein aggregating the user engagement probability values for each of the different objectives into an overall engagement probability value for the user comprises:
   calibrating each of the user engagement probability values for each of the different objectives according to a defined distribution and scale; and
   combining the calibrated user engagement probability values.

9. The method of claim 1, wherein the remote computing device processes the data associated with the contact channel for each user to:
   automatically populate a user interface of an electronic mail software application on the remote computing device with the data associated with the contact channel for each user; and
   simultaneously compose and send an electronic mail message from the remote computing device to a client computing device associated with a first user via the electronic mail software application.

10. A computer system for automated customer engagement prediction and classification, the system comprising a server computing device having a memory for storing computer-executable instructions and a processor that executes the computer-executable instructions to:
   generate a feature vector for each user of a plurality of users comprising a multidimensional array of variables corresponding to at least a portion of historical user activity data for the user, the historical user activity data comprising transaction data, demographic data, and user contact channel response data;
   encode, for each feature vector, each variable in the feature vector into a corresponding weight-of-evidence value;

transform each encoded feature vector into an embedding comprising a multidimensional array with fewer variables than the encoded feature vector and position the embeddings in a multidimensional vector space;
generate, for each user, a user engagement probability value by identifying one or more embeddings of other users in proximity to the embedding of the user using a similarity measure and determining an engagement outcome for the users associated with the identified embeddings;
assign each user to an engagement probability cluster based upon the user engagement probability value for the user;
determine a contact channel for each user based upon the engagement probability cluster to which the user is assigned; and
transmit data associated with the contact channel for each user to a remote computing device;
wherein the remote computing device processes the data associated with the contact channel for each user to:
automatically populate a user interface of an autodialing software application on the remote computing device with the data associated with the contact channel for each user; and
simultaneously initiate a telephone call from the remote computing device to a client computing device associated with a first user via the autodialing software application.

11. The system of claim 10, wherein generating a feature vector for each user of the plurality of users comprises:
preprocessing the historical user activity data for the user using one or more of feature engineering, missing value handling, or normalization.

12. The system of claim 10, wherein transforming each encoded feature vector into an embedding comprises:
applying a dimensionality reduction algorithm to the encoded feature vector to reduce the number of variables in the encoded feature vector; and
generating the embedding from the modified encoded feature vector.

13. The system of claim 12, wherein the dimensionality reduction algorithm comprises a variational autoencoder algorithm.

14. The system of claim 10, wherein identifying one or more embeddings of other users in proximity to the embedding of the user using a similarity measure comprises:
locating a plurality of embeddings of other users within a predetermined distance of the embedding of the user in the multidimensional vector space.

15. The system of claim 14, wherein determining an engagement outcome for the users associated with the identified embeddings comprises:
determining whether the users associated with the identified embeddings previously engaged with a contact channel.

16. The system of claim 10, wherein the server computing device:
generates, for each user, a user engagement probability value associated with each of a plurality of different objectives; and
aggregates the user engagement probability values for each of the different objectives into an overall engagement probability value for the user.

17. The system of claim 16, wherein aggregating the user engagement probability values for each of the different objectives into an overall engagement probability value for the user comprises:
calibrating each of the user engagement probability values for each of the different objectives according to a defined distribution and scale; and
combining the calibrated user engagement probability values.

18. The system of claim 10, wherein the remote computing device processes the data associated with the contact channel for each user to:
automatically populate a user interface of an electronic mail software application on the remote computing device with the data associated with the contact channel for each user; and
simultaneously compose and send an electronic mail message from the remote computing device to a client computing device associated with a first user via the electronic mail software application.

* * * * *